3,207,704
CATALYST COMPOSITIONS COMPRISING MANGANESE OXIDE PROMOTED BY TITANIUM, TIN OR LEAD ON ALUMINA
Ruth E. Stephens, Detroit, Daniel A. Hirschler, Jr., Birmingham, and Frances W. Lamb, Detroit, Mich., assignors to Ethyl Corporation, New York, N.Y., a corporation of Virginia
No Drawing. Filed May 1, 1962, Ser. No. 191,638
3 Claims. (Cl. 252—463)

This application is continuation-in-part of our application Serial No. 23,915 filed April 22, 1960, now abandoned.

This invention relates to manganese catalysts. More particularly, the invention relates to catalysts comprising manganese oxide and optionally a promoter metal supported on a specific transitional alumina. The invention also relates to a method of substantially oxidizing the hydrocarbon and carbon monoxide constituents which are present in the exhaust gas of internal combustion engines.

In recent years extensive research has been devoted to the alleviation of air pollution in many metropolitan areas. Part of this effort has been directed to methods of reducing the unburned hydrocarbons and carbon monoxide emitted with the exhaust gas of internal combustion engines. Various catalytic converter systems have been proposed to accomplish this purpose. With such systems the exhaust gases are passed through a catalytic bed wherein the noxious materials are converted to an inactive form.

In our earlier filed application Serial No. 23,915 we have described and claimed catalysts which are especially effective for the oxidation of hydrocarbon and carbon monoxide constituents of exhaust gases. These catalysts consist of transitional activated alumina having a surface area of at least 75 square meters per gram and a silica content of not more than 5 percent on which is impregnated or with which is mixed, manganese oxide such that the catalyst system contains between 0.5 and 25 percent of manganese in an oxide form. It was also found that under certain conditions, the inclusion of a small amount of another metal or metals further enhanced the properties of those catalysts. As described therein, those catalysts promote the oxidation of a great percentage of hydrocarbon and carbon monoxide emitted with the exhaust gas stream. Moreover, those catalysts are extremely resistant to the many catalyst poisons contained in the exhaust gas stream of current internal combustion engines.

Among the catalysts disclosed in the aforementioned application, a certain group has outstanding catalytic properties. The purpose of the present application is to specifically claim this highly preferred embodiment. The catalysts of the present invention comprise manganese oxide and optionally a promoter metal supported on a specific type of transitional alumina. When this particular type of transitional alumina is used, superior manganese catalysts are obtained, even more efficient than manganese catalysts wherein other seemingly similar transitional aluminas are used.

It is an object of this invention to provide novel oxidation catalysts. Another object is to provide oxidation catalysts which are active and which retain their high degree of efficient during long periods of use. Another object is to provide a method to substantially oxidize the unburned hydrocarbons and carbon monoxide found in the exhaust gas stream of internal combustion engines.

The objects of this invention are accomplished by providing novel catalysts especially adapted to substantially oxidize the unburned hydrocarbon and carbon monoxide constituents of the exhaust gas of internal combustion engines, said catalyst comprising a transitional alumina carrier impregnated with or mixed with from about 0.5 to 25 percent maganese in an oxide form and optionally from about 0.5 to 10 percent of a promoter metal, said transitional alumina comprising a mixture of from about 10 to 85 percent of chi, 10 to 85 percent of alpha monohydrate and from 5 to about 45 percent amorphous forms of transitional alumina, said transitional alumina further characterized by containing from 0.02 to about 5 percent silica and having a surface area of at least 75 square meters per gram. The transitional alumina carriers of this invention are substantially free of the eta form of transitional alumina. The present invention also embodies the method of substantially oxidizing unburned hydrocarbons and carbon monoxide contained in the exhaust stream of internal combustion engines which comprises passing said exhaust gas over and through the above-described catalysts.

By the use of the catalysts of this invention, substantial amounts of the carbon monoxide are converted to carbon dioxide and a large percentage of the unburned hydrocarbons are completely oxidized to carbon dioxide and water. Further, the catalysts of this invention are active over a wide temperature and under a wide variety of operating conditions. Other important aspects of the catalysts of this invention are excellent thermal stability at extremely high temperatures and that they do not catalyze the oxidation of nitrogen. Still another advantage is the resistance of these catalysts to the many potential catalyst poisons found in exhaust gas such as the products of combustion of organolead anti-knock agents and other additives found in current commercial gasolines. In spite of such an extremely adverse environment, the present catalysts operate efficiently over long periods of time.

The catalysts contemplated by this invention contain from about 0.5 to 25 percent manganese in an oxide form and from 0.5 to about 10 percent of a promoter metal. In many applications an optimum concentration is from about 4 to 15 percent manganese and from about 2 to 5 percent of a promoter metal. With a freshly prepared catalyst, the manganese is present in one of its oxidized states. The promoter metal may be present in the metallic state or as an oxide. When in actual operation, the catalyst system is very complex, but the metals no doubt fluctuate through various oxidation states depending upon temperature and the nature of the environment.

As disclosed in the aforementioned application Serial No. 23,915, a variety of transitional aluminas are useable to obtain excellent manganese catalysts. As described therein, transitional aluminas are meta-stable forms which, in general, are produced by heating of alpha or beta alumina trihydrate or of alpha alumina monohydrate. As each of these starting materials or any mixture thereof is heated, phase changes take place. A number of intermediate or transitional alumina phases are formed. These are characterized by being only partially or poorly crystalline. They are partly amorphous and partly crystalline. Formation of these phases is reversible; on rehydration they can be converted back to the starting materials. On prolonged heating, particularly at very high temperatures such as 1150° C., they are converted into the so-called "alpha alumina" which is a stable, refractory type of alumina.

In the overall transition between the alumina hydrates and alpha alumina, several different transitional aluminas are prepared, either simultaneously or concurrently. Some of these transitional phases are convertible to others upon proper heating or cooling. According to the nomenclature used in the pamphlet "Alumina Properties," Russell et al, published by the Aluminum Company of America, Pittsburgh, Pennsylvania, 1956; the names assigned to the various transitional aluminas are gamma, delta, eta, theta, kappa, chi and rho. In addition, the alpha monohydrate itself is in a sense a transitional alumina since it is a product reversibly obtained on heating of either alpha or beta alumina trihydrate under suitable conditions of temperature and time. In addition to the forms described above, there is an amorphous alumina which is characterized by having no definitive X-ray diffraction pattern. However, some workers have assigned a characteristic broad X-ray line at 4.5 A. to amorphous alumina. Amorphous alumina is the least crystalline of the principle alumina phases. In a sense this alumina can also be considered to be transitional, for upon heating, its structure may be converted to other forms of transitional alumina.

It appears not possible to describe each transitional alumina in terms of its specific physical properties other than those mentioned above. Many can be characterized by their X-ray diffraction pattern. Several of these are reproduced on page 28 of the pamphlet referred to above.

While many of the above-described transitional aluminas may be used to obtain excellent oxidation catalysts, we have found that the use of one particular combination of transitional aluminas results in superior manganese catalysts. Such catalysts are more efficient and have a longer longevity than otherwise similar manganese catalysts but using another form of transitional alumina. In other words, a particular type of transitional alumina is specific for manganese catalysts and is preferred over other forms of apparently closely related transitional aluminas.

The transitional aluminas used in the catalysts of this invention comprise a mixture of the chi, alpha monohydrate and amorphous forms of transitional aluminas. It is essential that the transitional alumina mixture contain from 10 to 85 percent alpha monohydrate, 10 to 85 percent chi and from 5 to 45 percent amorphous forms of transitional aluminas. The aluminas useful as carriers of this invention are substantially free of the eta form of transitional alumina. A preferred transitional alumina carrier of this invention comprises a mixture of about 40 percent chi, about 40 percent alpha monohydrate and about 20 percent amorphous forms of transitional alumina.

In addition to the inherent transitional nature of the alumina itself, certain other properties are essential for use as carriers of this invention. The most important of these is the surface area/mass ratio and the content of silica, $SiO_2$. The transitional alumina must have a surface area/mass ratio of at least 75 square meters per gram and a silica content of from about 0.02 to 5 percent. In order to function efficiently according to this invention, the transitional alumina must meet both these requisites. If the surface area is greater than the above minimum but the silica content does not fit within the above-described limits, the alumina does not function well. By the same token, if silica content is between 0.02 and 5 percent but the surface area is below 75 square meters per gram, the alumina does not function as a carrier of this invention. Nor does it so function if neither the silica content nor the surface area is within the above specifications.

In illustration of the importance of the above properties, we have tested aluminas with surface areas as high as 350 m.²/g. but with silica content greater than 5 percent. These have resulted in catalysts with inferior properties with respect to exhaust gas conversion. Also, the alumina with a silica content less than 5 percent but with a surface area of only 0.5 m.²/g. was ineffective as a support for manganese oxide.

It is not possible to ascribe definite preparative procedures to prepartion of the transitional aluminas of this invention. Conversion of the starting material—alpha and beta alumina trihydrates and alpha alumina monohydrates—to one or more of the various transitional aluminas, as well as conversion of one traditional alumina to another, is a function of both time and temperature. Heating to a high temperature for a short time could result in a mixture of transitional aluminas having the same composition as is produced by heating the same starting mixture or ingredient to a given lesser temperature for a longer time. Generally speaking, alpha alumina trihydrate is converted to the alpha monohydrate, a transitional alumina of this invention, at about 140° C. in air or superheated steam, and at about 100° C. in vacuum. Beta alumina trihydrate appears to be readily converted to the alpha monohydrate at about 120–160° C. Heating of the alpha trihydrate to about 140° C. for one hour results in some conversion to the chi transitional form which is another transitional alumina of this invention. The chi form, in turn, goes over to some extent to the kappa transitional alumina when heated to about 500° C. for one hour. Heating of the alpha monohydrate for one hour at 250° C. gives some gamma, which on heating at 850° C. for the same length of time, produces some theta transitional alumina with possible intermediate conversion to delta. Heating of the beta trihydrate to 140° C., in addition to producing some alpha monohydrate, also produces some of the eta activated form. This, in turn, goes over to the theta on heating at 450° C. The kappa and theta forms are converted to alpha alumina on heating to 1150° C. for one hour.

Amorphous alumina, the third transitional alumina of this invention can be obtained from either alpha or beta trihydrate. Amorphous alumina is frequently encountered in the decomposition of alumina compounds, in the precipitation of alumina, and in the oxidation of alumina.

In general then, the transitional aluminas used in this invention are prepared by heating a starting alumina selected from the class consisting of alpha alumina trihydrate and beta alumina trihydrate to a temperature of at least 100–150° C. for a period of time sufficient to permit substantial conversion to chi, alpha monohydrate, and amorphous forms of transitional alumina, but insufficient to convert a substantial fraction of these transitional aluminas to other phases. In general, prolonged heating above about 800° C. should be avoided. Our carriers may contain small amounts of either the starting material, transitional aluminas other than those of this invention, alpha alumina, or a combination of the aforesaid.

The three requisite forms of alumina may be formed independently and physically mixed, or they may be prepared simultaneously. However, due to economic considerations, the latter technique is preferred.

One method of large-scale preparation of the alumina carriers of this invention is as a by-product of the Fickes-Sherwin modification of the Bayer process in the manufacture of metallic aluminum. During the process, aluminum trihydrate is precipitated from alkali aluminate solutions. This material, a scale-like deposit, is then crushed or ground and calcined at a temperature between 300 and about 800° C. The finished material comprising a mixture of the chi, alpha monohydrate, and amorphous forms of transitional alumina, is used primarily as a commercial adsorbent. It does not readily pack, can be used in high-pressure applications, and, after use, can be readily regenerated.

Certain aluminas meeting the requisites of this invention are commercially available. Included among these are those sold by Aluminum Company of America as "Desiccant Grade Active Aluminas; Grade F–1 and F–3."

Analyses and physical properties of these transitional aluminas are:

CHEMICAL ANALYSIS, PERCENT

|  | F-1 | F-3 |
|---|---|---|
| $Al_2O_3$ | 92.0 | 92.0 |
| $Na_2O$ | 0.8 | 0.8 |
| $Fe_2O_3$ | 0.12 | 0.12 |
| $SiO_2$ | 0.09 | 0.09 |
| Loss on ignition, 1100° C | 6.8 | 7.2 |
| Static adsorption at 60 percent relative humidity, percent | a 13.0 | a 11.0 |

PHYSICAL PROPERTIES

| | | |
|---|---|---|
| Surface area, m.²/g | 210 | 200 |
| Form | Granular | |
| Bulk density, lb./ft.³ | 55 | 55 |
| Specific gravity | 3.3 | 3.3 |
| Pore volume, ml./g | 0.25 | 0.25 |
| Pore diameter, A | 40 | 40 |
| Dynamic sorption, percent | 13–15 | 11–13 |
| Crushing strength, percent | 55 | 55 | a Minimum.

Both F–1 and F–3 aluminas are composed of approximately 40 percent alpha monohydrate, 40 percent chi, and 20 percent amorphous forms of alumina.

We have also found that under certain conditions, the inclusion of a small amount of another metal or metals may further enhance the properties of our catalysts. The additional metal or metals act as a "promoter"; that is, though in themselves they may have little activity, they impart better characteristics to the finished catalysts. Generally, promoters serve to improve the activity, stability or selectivity for the reaction in question, and oftentimes it is difficult to make a distinction as to their specific function. We have found that the inclusion of up to 10 percent, based on the total weight of the catalyst-carrier system, of a promoter metal or metals may, to a degree, improve efficiency and life of the catalysts of this invention. The promoter in the finished catalyst is usually in an oxide form, but in some cases, e.g. silver, it may exist as the free metal. Metals that may be used as promoters include sodium, lead, potassium, magnesium, calcium, strontium, barium, titanium, zirconium, iron, cobalt, nickel, copper, zinc, cadmium, germanium, tin, silver, cerium, cesium, and the like. These metals may be introduced during preparation of the catalysts as salts such as the nitrate, acetate, carbonate, and the like, or in the form of oxides or hydroxides, or even as the finely divided metal itself. A less desirable method is to impregnate a finished manganese oxide-alumina catalyst with a promoter metal in one or more of the above forms.

The catalysts of this invention may be prepared in a variety of ways. They may be prepared by contacting the activated transitional alumina with a solution, not necessarily aqueous, of an organic or inorganic compound of manganese, allowing sufficient time for impregnation, and then subjecting the mass to appropriate conversion treatment. The conversion consists of thermal treatment to remove free water from the system, to convert the manganese to the oxide form, and to convert the promoter metal to its active form. A great variety of specific conversion techniques are well known to those skilled in the art. If it is desired to impregnate the alumina with both a catalytic agent and a promoter, the alumina can be contacted successively with a solution of each metal in either order, or with one solution containing both metals. The catalysts can be prepared from organic compounds of manganese such as the cyclopentadienyl derivatives, the carbonyl derivatives, etc. Examples are cyclopentadienyl manganese tricarbonyl, dimanganese decacarbonyl, cyclopentadienyl manganese benzene, etc. Preferably, the catalysts are prepared from manganese nitrates, carbonates, acetates, sulfates, hydroxides, lactates, formates, acetates, oxalates, propionates, benzoates and the like. The same general types of salts are useful for impregnating the substrate with a promoter metal or metals when a promoter is desired. We have found that superior catalysts can be prepared by using nitrates, oxalates or acetates of the metals. Particularly excellent results are obtained when an acetate or a nitrate of the metal is used as the starting material. Other methods of preparing mixtures of transitional aluminas and manganese oxides can also be used. For example, the manganese oxide may be incorporated into the transitional alumina during the conversion of the starting alumina to the transitional form.

The following examples are illustrative of some of our preferred catalysts.

*Example I*

F–1 grade alumina pellets are washed in lukewarm water to remove fines and extraneous matter, drained, then mixed with crystalline manganese acetate tetrahydrate. F–1 transitional alumina is prepared by calcination of alpha alumina trihydrate and comprises a mixture of approximately 40 percent chi, 40 percent alpha monohydrate, and 20 percent amorphous forms of transitional aluminas described earlier in this specification. The mixture is stirred and heated, the manganese acetate tetrahydrate melting in its own water by hydration. Heat is applied up to a point wherein all the free water has been evaporated. At this point the alumina pellets are coated with manganese acetate and have a slightly moist texture. The mixture is then spread on a surface which is heated to above the decomposition temperature of manganese acetate. A draft of air or inert gas is then passed over the material. During the heating, the manganese acetate decomposes to an oxide or mixture of oxides. Our studies have shown that both the $Mn_2O_3$ and $Mn_3O_4$ oxides are present. The finished material is F–1 alumina impregnated with oxides of manganese. In this example the finished catalyst contained 0.5 percent manganese. This concentration is determined by the relative amounts of alumina and manganese acetate used in the preparation.

*Example II*

The procedure of Example I is followed but an amount of manganese acetate tetrahydrate is used such that the finished catalyst is composed of 15 percent manganese in an oxide form.

*Example III*

The procedure of Example I is followed using as the source of manganese a 50–50 mixture of manganese acetate tetrahydrate and manganese nitrate, but the amount of manganese salts used is such that the finished catalyst is composed of 25 percent manganese in an oxide form.

*Example IV*

A transitional alumina composed of 10 percent alpha alumina monohydrate, 5 percent amorphous alumina and 85 percent of chi alumina is mixed with a solution of manganese acetate and lead acetate. The solution is heated so as to evaporate all the free water and the procedure of Example I followed. The finished catalyst is transitional alumina impregnated with oxides of manganese and lead, comprising by weight 10 percent manganese and 5 percent lead.

Example V

The procedure of Example IV is repeated using a solution of manganese acetate and copper acetate. The final catalyst material comprises transitional alumina impregnated with oxides of manganese and oxides of copper. The catalyst contains about 15 percent manganese and 2 percent copper. The transitional alumina used in this catalyst comprises a mixture of 45 percent amorphous alumina, 30 percent chi alumina and 25 percent alpha alumina monohydrate.

Example VI

F-3 alumina is mixed with a solution of manganese acetate and chromium acetate and the solution is heated to evaporate all the free water and the procedure of Example I is followed. This granular transitional alumina is made by controlled calcination of alpha alumina trihydrate and comprises a mixture of approximately 40 percent chi, 40 percent alpha monohydrate, and 20 percent amorphous forms of transitional alumina. The finished catalyst is F-3 alumina impregnated with oxides of manganese and chromium, comprising 10 percent manganese and 5 percent chromium.

Example VII

Transitional alumina is mixed with a solution of manganese acetate and barium acetate and the solution is heated to dryness and the procedure of Example I followed. The finished catalyst is transitional alumina impregnated with oxides of manganese and barium comprising 10 percent barium and 15 percent manganese. The transitional alumina is composed of approximately 85 percent alpha alumina monohydrate, 10 percent chi and 5 percent amorphous alumina.

Example VIII

A colloidal aqueous suspension of titanium acetate is mixed with a solution of manganese acetate. F-1 transitional alumina is introduced into the resulting mixture, and the procedure of Example I is followed. The finished catalyst is F-1 alumina impregnated with oxides of manganese and titanium, comprising by weight 7 percent manganese and 2 percent titanium.

Example IX

A catalyst is prepared using amounts of manganese acetate and cerium acetate such that the finished catalyst comprises transitional alumina impregnated with oxides of manganese and cerium comprising by weight 5 percent manganese and 3 percent cerium. This transitional alumina comprises a mixture of 50 percent alpha alumina monohydrate, 30 percent chi, 18 percent amorphous alumina, and minor amounts of other forms of transitional and alpha alumina.

Several catalysts of this invention and a variety of other catalysts were tested using the exhaust gas of a CFR L-Head, 7:1 compression ratio, single cylinder engine. As a preliminary test, the exhaust gas was split into two streams and two different catalysts were tested simultaneously. Each stream was passed over a catalyst bed consisting of 42 cubic inches of a catalyst material. A secondary air supply, to provide oxygen for the oxidation, was introduced into the exhaust gas stream just prior to the catalyst bed. This air supply was constant throughout the testing period. In a subsequent test the total exhaust gas from the engine, together with some secondary air, was passed over a catalyst bed consisting of 86 cubic inches of the catalyst material. During both tests the engines were continually cycled, 50 seconds under idling conditions, and 150 seconds at wide-open throttle. The operating conditions for the two tests are as follows:

TABLE I
*Engine operating conditions*

|  | 42 cu. in. catalyst bed test | | 86 cu. in. catalyst bed test | |
|---|---|---|---|---|
|  | Idle | Wide-open throttle | Idle | Wide-open throttle |
| Engine speed, r.p.m. | 750 | 1,140 | 750 | 1,140 |
| Volume of exhaust gas s.c.f.h. | 90 | 250 | 180 | 500 |
| Volume of secondary air s.c.f.h. | 40 | 40 | 80 | 80 |
| Hydrocarbon (vol. percent) | 0.04 | 0.03 | 0.04 | 0.03 |
| $CO_2$ (vol. percent) | 4 | 10 | 4 | 10 |
| CO (vol. percent) | 7 | 3 | 7 | 3 |
| $O_2$ (vol. percent) | 9 | 4.5 | 9 | 4.5 |
| Space velocity (v./v./hr.) | 5,350 | 11,900 | 5,200 | 11,600 |

In the first test, namely, determination of oxidation efficiencies of a variety of catalysts by passing exhaust gas over the 42 cubic inch bed, the engine was operated on a non-leaded gasoline of the following composition:

*Fuel composition*

ASTM distillation: °F.
   Initial boiling point _____ 97
   10 percent evaporated _____ 148
   50 percent evaporated _____ 266
   90 percent evaporated _____ 327
   Final boiling point _____ 422
Hydrocarbon type, vol. percent:
   Aromatics _____ 40
   Olefins _____ 4
   Saturates _____ 56
Sulfur, wt. percent _____ 0.016

The hydrocarbon and carbon monoxide concentrations of the exhaust stream were measured before and after passage through the catalyst bed. All measurement were obtained under equilibrium conditions at wide-open throttle.

The compositions of some of the catalysts investigated in this test are shown in Table II. Various metals are listed as active agents. It will be understod that by this designation is meant the indicated metal(s) in various oxide forms.

TABLE II
*Catalyst compositions*

CATALYSTS NOT OF THIS INVENTION

| Catalyst | Active agent(s) | Carrier Composition | Surface area, m.²/g. |
|---|---|---|---|
| A | Mn, Pb | Silicon carbide | nil |
| B | Mn, Pb | 50% alpha alumina monohydrate; 50% gamma alumina (6% silica). | 350 |
| C | V | ___do___ | 350 |
| D | Mn, Sn | ___do___ | 350 |

CATALYSTS OF THIS INVENTION

| Catalyst | Active agent(s) | Carrier Composition | Surface area, m.²/g. |
|---|---|---|---|
| E | Mn | F-1 alumina: 40% chi alumina; 40% alpha alumina monohydrate; 20% amorphous alumina (0.09% silica). | 210 |
| F | Mn, Ti | ___do___ | |
| G | Mn, Sn | ___do___ | |
| H | Mn, Pb | F-3 alumina: 40% chi alumina; 40% alpha alumina monohydrate; 20% amorphous alumina (0.09% silica). | 200 |

The results of these tests, as percent of hydrocarbon and carbon monoxide oxidized, are summarized in Table III.

TABLE III

*Oxidation efficiencies of various catalysts*

ENGINE OPERATED ON NON-LEADED FUEL

|  | Catalysts not of this invention | | | | Catalysts of this invention | | | |
|---|---|---|---|---|---|---|---|---|
| Catalyst | A | B | C | D | E | F | G | H |
| Active agent | Mn, Pb | Mn, Pb | V | Mn, Sn | Mn | Mn, Ti | Mn, Sn | Mn, Pb |
| Test hours: | Hydrocarbon reduction, percent | | | | | | | |
| 0 | 28 | 60 | 55 | 59 | 69 | 54 | 53 | 53 |
| 25 | 19 | 44 | 75 | 47 | 65 | 59 | 66 | 55 |
| 50 | 15 | 42 | 62 | 43 | 62 | (a) | 58 | 52 |
|  | Carbon monoxide reduction, percent | | | | | | | |
| 0 | 22 | 77 | 22 | 73 | 90 | 98 | 100 | 98 |
| 25 | (a) | 60 | (a) | 32 | 90 | 81 | 83 | 83 |
| 50 | (a) | 32 | (a) | 8 | 85 | (a) | 62 | 75 | a Not determined.

The results of the preceding tests show that catalysts E through H, catalysts of this invention, are superior to otherwise similar catalysts but utilizing different carrier materials. The above results permit a direct comparison of otherwise similar catalysts but differing in a critcial property. For example, catalysts A, B and H are all manganese-lead catalysts. However, these catalysts use different carrier materials and gave vastly different results. Catalyst A, using silicon carbide as a carrier, was an ineffective catalyst.

The effectiveness of catalyst B in oxiding carbon monoxide was very low, and thus this catalyst is unacceptable for the purpose contemplated. The carrier of this catalyst is a transitional alumina, but because of its high silica content is not useable in this invention. Also, the carrier does not contain the required chi and amorphous forms of alumina. In contrast, manganese-lead catalyst H, using a carrier material of this invention, showed superior properties. Note particularly the high efficiency with respect to oxidation of carbon monoxide as compared to catalyst B.

Similar comparisons are available between manganese-tin catalysts D and G. Catalyst G, using a carrier material of this invention, was clearly superior to catalyst D which used a transitional alumina carrier not having the requisite chi and amorphous forms of tranistional alumina. Also, this carrier had a silica content greater than that allowable for carriers of this invention.

The above tests clearly show that manganese catalysts using the carrier materials of this invention are superior to otherwise similar catalysts, but which use alumina carriers not having the specified properties.

Catalyst C, composed of vanadium pentoxide on a transitional alumina, though fairly active with respect to hydrocarbon oxidation, showed an extremely low efficiency (22 percent) toward promoting the oxidation of carbon monoxide. The carrier material of this catalyst was composed of gamma and alpha monohydrate and, therefore, is not useable as a carrier for the catalysts of this invention.

Further investigations were conducted on a variety of catalysts using a fuel leaded to 3.0 grams of lead per gallon as tetraethyllead. The exhaust gas was passed over a catalyst bed consisting of 86 cubic inches. This test was conducted under the conditions described in Table I above. The oxidation efficiencies of a vanadium pentoxide-alumina catalyst and a manganese oxide catalyst of this invention are compared in Table IV. The composition of the carrier for the vanadia catalyst was essentially the same as for catalyst B described in Table II (gamma and alpha monohydrate aluminas), and the carrier for the manganese catalyst was F-1 alumina, a carrier of this invention.

TABLE IV

*Oxidation efficiencies*

ENGINE OPERATED ON FUEL CONTAINING 3.0 ML. TETRAETHYLLEAD

|  | Hydrocarbon reduction, percent | | CO reduction, percent | |
|---|---|---|---|---|
| Test hours | Vanadium pentoxide on transitional alumina a | Manganese oxide on F-1 transitional alumina | Vanadium pentoxide on transitional alumina a | Manganese oxide on F-1 transitional alumina |
| 0 | 73 | 76 | 22 | 100 |
| 25 | 85 | 85 | 21 | 95 |
| 50 | 86 | 83 | (b) | 86 |
| 75 | 84 | 77 | (b) | 74 |
| 100 | 60 | 71 | (b) | 65 |
| 125 | 62 | 65 | (b) | 52 | a Transitional alumina not of this invention.  b Not determined.

It is apparent that both catalysts have excellent properies with respect to oxidizing the unburned hydrocarbon constituents of exhaust gases. The efficiencies of both are as high as about 85 percent during the initial part of the test. Even after 125 hours of testing, both catalysts showed an efficiency of over 60 percent. However, the catalyst of this invention is remarkably superior in the oxidation of carbon monoxide. Whereas the efficiency of the vanadium pentoxide catalyst in oxidizing carbon monoxide was only about 20 percent or less throughout the test, the catalyst of this invention showed efficiency of over 90 percent during the initial testing period. Even after 125 hours of use, it still retained an efficiency of 52 percent. This is a very important feature of the catalysts of this invention since the elimination of carbon monoxide is equally if not more important than the elimination of the unburned hydrocarbons.

Tetraethyllead, a constituent of the vast majority of commerical gasolines, is known as a poison to many catalysts. To further determine the resistance to poisoning of the catalysts of this invention, engine tests were conducted using a fuel containing an exaggerated amount, namely 12 grams per gallon of lead as tetraethyllead, rather than the amount ordinarily found in gasolines (2–4 grams per gallon).

The compositions of some of the catalysts evaluated under these conditions are shown in Table V, and the oxidation efficiencies in Table VI.

TABLE V

Catalyst compositions

CATALYSTS NOT OF THIS INVENTION

| Catalyst | Active agent(s) | Carrier Composition | Surface area, m.²/g. |
|---|---|---|---|
| K | V | 50% alpha alumina monohydrate; 50% gamma alumina (6% silica). | 350 |
| L | Mn | Alpha alumina (0.02% silica) | 0.5 |

CATALYSTS OF THIS INVENTION

| Catalyst | Active agent(s) | Carrier Composition | Surface area, m.²/g. |
|---|---|---|---|
| M | Mn | F-1 alumina: 40% chi alumina; 40% alpha alumina monohydrate; 20% amorphous alumina (0.09% silica). | 210 |
| N | Mn | F-3 alumina: 40% chi alumina; 40% alpha alumina monohydrate; 20% amorphous alumina (0.09% silica). | 200 |
| O | Mn, Ti | F-1 alumina: 40% chi alumina; 40% alpha alumina monohydrate; 20% amorphous alumina (0.09% silica). | 210 |

TABLE VI

Oxidation efficiencies of various catalysts

ENGINE OPERATED ON FUEL CONTAINING 12 ML. TETRAETHYLLEAD

|  | Catalysts not of this invention | | Catalysts of this invention | | |
|---|---|---|---|---|---|
| Catalyst | K | L | M | N | O |
| Active agent | V | Mn | Mn | Mn | Mn, Ti |
| Test hours: | Hydrocarbon reduction, percent | | | | |
| 00 | 45 | 33 | 72 | 71 | 73 |
| 25 | 33 | 0 | 65 | 61 | 73 |
| 50 | 20 | (a) | 53 | 54 | 66 |
| 75 | 20 | (a) | 50 | 45 | 62 |
|  | Carbon monoxide reduction, percent | | | | |
| 0 | 5 | 33 | 92 | 81 | 100 |
| 25 | 7 | 12 | 87 | 78 | 93 |
| 50 | 11 | (a) | 70 | 72 | 92 |
| 75 | 11 | (a) | 71 | 67 | 68 | a Not determined.

Under the conditions of this test, the catalysts of this invention show an even greater advantage over other catalysts that were tested. The vanadia pentoxide-transitional alumina catalyst K had very low efficiency with respect to oxidation of both hydrocarbon and carbon monoxide. Similarly, catalyst L, manganese oxide on alpha alumina, was very ineffective. Both these catalysts are unacceptable for the purpose of this invention. In contrast, catalysts M, N and O, preferred catalysts of this invention, promoted the oxidation of both hydrocarbons and carbon monoxide to a high degree. Even after being in use for 75 hours, these catalysts were much more active than were catalysts K and L at the beginning of test. High efficiency over long periods of time is one of the features of the catalysts of this invention.

An important feature of the catalysts of this invention is their excellent thermal stability properties. The catalyst bed temperature under normal engine operation may vary from 400 to 1700° F. Under extreme conditions of severe acceleration and deceleration, bed temperatures as high as 2000° F. have been observed. Using catalysts of this invention, catalyst beds have been operated at temperatures as high as 2200° F. with no apparent damage to the catalyst material. The property of heat stability is very important because it obviates the necessity of installing a mechanical system to have the exhaust gas by-pass the catalyst bed in case of extremely high temperatures. Such a by-pass system would be required if the catalyst were susceptible to damage at high temperatures. Good thermal stability is also desirable in that it allows the reaction to be carried out at higher temperatures wherein higher efficiencies may be attained. Furthermore, this property becomes important when considering the design of a commercial vehicle exhaust system incorporating an oxidation catalyst. The additional heat from the oxidation process would naturally tend to overheat the passenger compartment. This problem could be solved by insulating the catalyst bed and exhaust system. Of course this would be possible only if the catalyst could tolerate the higher temperatures due to the insulation.

Still another important feature of the catalysts of this invention is their ability to catalyze reactions at extremely low temperatures. Since catalyst activity generally increases with temperature, in many applications it can be optimized by the simple expediency of increasing reaction temperatures. However, in exhaust gas conversion, temperatures cannot readily be controlled and a rather anomalous requisite of high activity at both low and high temperatures is imposed. The catalysts of this invention are active at a temperature as low as 350° F.; i.e., temperatures below that of the exhaust gas stream. Of course, as the oxidation starts, the heat of reaction serves to raise bed temperatures to a much higher level.

A further important requisite of a catalyst for this application is that the oxidation go to completion rather than to yield incompletely oxidized products such as olefins, aldehydes, ketones, etc. Such products tend to react with other atmospheric constituents and substantially contribute to photochemical smog. Moreover, many of these products have very disagreeable odors. Our tests have shown that using the catalysts of this invention, the oxidation of hydrocarbons is essentially a complete reaction, resulting in substantially a complete conversion to carbon dioxide and water. The final product discharged to the atmosphere is essentially free of any noxious odors.

Another feature of the catalysts of this invention is their ability to catalyze the oxidation of hydrocarbons and carbon monoxide without the concomitant oxidation of nitrogen. This is an important consideration. Oxides of nitrogen, and their subsequent reaction products readily contribute to the formation of photochemical smog and are eye and respiratory irritants.

Catalysts of this invention have been tested under actual operating conditions in modern automobiles with excellent results; namely, substantial and essentially complete oxidation of hydrocarbons and carbon monoxide, a discharge exhaust gas substantially free of noxious odors, activity at both high and low temperatures and under a wide variety of operating conditions, resistance to poisons in the exhaust stream, particularly lead salts, and resistance to attrition due to physical shock. With regard to poisoning by sulfur in the gasoline, best results are achieved at higher operating temperatures, particularly when the sulfur content of the gasoline approaches a high level. In general, when using gasolines with moderate to high sulfur concentrations, use of higher operating temperatures when possible is recommended. When lower operating temperatures are used, the sulfur content of the gasoline should be kept below about 0.06 weight percent.

The fuels used during these tests contain a variety of modern fuel additives and the catalysts were remarkably resistant to poisoning from these varied sources. The vehicle tests, conducted under typical urban and country driving conditions, provided an opportunity to investigate the effects of physical and thermal shock on the catalyst material. These tests revealed that in spite of the many shocks and continual agitation, the resistance to attrition of the catalysts of this invention is such that special mechanical contrivances are not required to safeguard the catalyst material. The catalyst is simply put into a suitable container with openings to receive and discharge the exhaust gases. To firmly retain the catalyst material, the receiving and discharge openings are covered with wire screening. The container may have internal baffling to allow greatest contact between catalyst and exhaust gas, and/or to use the hot reaction gases to heat the incoming exhaust gases. The container may actually replace the vehicle muffler, or it may be incorporated into the conventional exhaust system of current vehicles. The catalyst bed may also be located in the exhaust manifold or in the tailpipe of the exhaust system.

To aid the oxidation, secondary air may or may not be introduced into the system. To obtain maximum efficiency, we have found it preferable to introduce secondary air into the system. This is accomplished by the use of a variable speed blower, so that the amount of secondary air varies with operating conditions. The secondary air supply may also be introduced as a natural flow through the use of an appropriate air scoop or the like.

Our catalysts can be used to convert the exhaust gas of any gasoline. The gasolines can be of the aliphatic, aromatic and olefinc type including both straight run and catalytically produced gasolines and any and all mixtures thereof. The gasolines can contain the usual additives including organolead and other antiknock agents, such as tetraethyllead, tetraphenyllead, tetramethyllead, mixtures of alkylleads, such as tetraethyllead-tetramethyllead mixtures, ferrocene, cyclopentadienyl manganese tricarbonyl, cyclopentadienyl nickel nitrosyl, scavengeres, antioxidants, dyes, deposit modifiers, including trimethyl phosphate, dimethylphenyl phosphate, and the like. A particular advantage to use of the present catalysts with gasolines containing cyclopentadienyl manganese tricarbonyl antiknock agents is that such antiknock agents actually rejuvenate a catalyst whose activitiy has descreased due to the poisoning and coating effects of gasoline constituents. This is especially true with regard to the poisoning effects of oxides of sulfur present in the exhaust gas.

In addition to use in spark ignition internal combustion engines, the present catalyst may also be used to reudce or eliminate unburned hydrocarbons and carbon monoxide from the exhaust products of combustion processes in general. This includes the compression ignition engine, oil and coal furnaces, residual fuel burners, etc.

We claim:

1. A catalyst composition especially adapted to substantially oxidize the unburned hydrocarbons and carbon monoxide constituents of the exhaust gas of internal combustion engines, said composition consisting essentially of a major portion of a transitional alumina, and manganese oxide in amount corresponding to from about 0.5 to about 25 percent by weight of manganese as said oxide, said transitional alumina comprising from 10 to about 85 percent chi, from 10 to 85 percent alpha alumina monohydrate and from 5 to 45 percent amorphous forms of alumina, said transitional alumina further characterized by having a silica content of from 0.02 to about 5 percent silica and having a surface area of at least 75 square meters per gram, said composition additionally containing from about 0.5 to 10 percent by weight of titanium as a promoter metal.

2. A catalyst composition especially adapted to substantially oxidize the unburned hydrocarbons and carbon monoxide constituents of the exhaust gas of internal combustion engines, said composition consisting essentially of a major portion of a transitional alumina, and manganese oxide in amount corresponding to from about 0.5 to about 25 percent by weight of manganese as said oxide, said transitional alumina comprising from 10 to about 85 percent chi, from 10 to 85 percent alpha alumina monohydrate and from 5 to 45 percent amorphous forms of alumina, said transitional alumina further characterized by having a silica content of from 0.02 to about 5 percent silica and having a surface area of at least 75 square meters per gram, said composition additionally containing from about 0.5 to 10 percent by weight of tin as a promoter metal.

3. A catalyst composition especially adapted to substantially oxidize the unburned hydrocarbons and carbon monoxide constituents of the exhaust gas of internal combustion engines, said composition consisting essentially of a major portion of a transitional alumina, and manganese oxide in amount corresponding to from about 0.5 to about 25 percent by weight of manganese as said oxide, said transitional alumina comprising from 10 to about 85 percent chi, from 10 to 85 percent alpha alumina monohydrate and from 5 to 45 percent amorphous forms of alumina, said transitional alumina further characterized by having a silica content of from 0.02 to about 5 percent silica and having a surface area of at least 75 square meters per gram, said composition additionally containing from about 0.5 to 10 percent by weight of lead as a promoter metal.

References Cited by the Examiner

UNITED STATES PATENTS

| | | | |
|---|---|---|---|
| 1,975,476 | 10/34 | Pier et al. | 252—456 X |
| 2,841,603 | 7/58 | Zellner et al. | 252—471 X |
| 2,945,057 | 7/60 | McDaniel et al. | 252—463 X |
| 3,071,601 | 1/63 | Aries | 252—471 X |

MAURICE A. BRINDISI, *Primary Examiner.*